United States Patent
Lo et al.

(10) Patent No.: US 12,126,945 B2
(45) Date of Patent: Oct. 22, 2024

(54) FOCUS IDENTIFICATION METHOD AND FOCUS IDENTIFICATION SYSTEM THEREOF

(71) Applicant: Coretronic Corporation, Hsin-Chu (TW)

(72) Inventors: Yu-Wen Lo, Hsin-Chu (TW); Chien-Chun Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/082,596

(22) Filed: Dec. 16, 2022

(65) Prior Publication Data

US 2023/0224444 A1 Jul. 13, 2023

(30) Foreign Application Priority Data

Jan. 10, 2022 (CN) .......................... 202210019558.9

(51) Int. Cl.
*H04N 9/31* (2006.01)

(52) U.S. Cl.
CPC .......... *H04N 9/3191* (2013.01); *H04N 9/317* (2013.01); *H04N 9/3176* (2013.01)

(58) Field of Classification Search
CPC .... H04N 9/3191; H04N 9/317; H04N 9/3176; H04N 9/3194; H04N 9/3141; G09G 5/02; G09G 2320/0693; G02B 7/36; G03B 21/142; G03B 21/53; G06F 3/1446
See application file for complete search history.

(56) References Cited

U.S. PATENT DOCUMENTS

| 9,374,519 B2 * | 6/2016 | Wakazono | H04N 23/80 |
| 2005/0185844 A1 * | 8/2005 | Ono | G06V 20/64 |
| | | | 707/E17.024 |

(Continued)

FOREIGN PATENT DOCUMENTS

| CN | 103955924 | 7/2014 |
| CN | 109698946 | 4/2019 |

(Continued)

OTHER PUBLICATIONS

"Search Report of Europe Counterpart Application", issued on Jun. 5, 2023, p. 1-p. 13.

*Primary Examiner* — Michael Lee
(74) *Attorney, Agent, or Firm* — JCIPRNET (57) ABSTRACT

A focus identification method adaptable for a focus identification system is provided. The focus identification method includes: capturing a projection picture to generate a captured picture; dividing the captured picture into a plurality of image regions; calculating a plurality of sharpness values corresponding to the plurality of image regions respectively according to image data of the plurality of image regions; and displaying the plurality of sharpness values on the projection picture corresponding to the plurality of image regions respectively the to generate a first focus identification picture. Moreover, the disclosure further discloses a focus identification system applying the focus identification method. The focus identification method and the focus identification system using the same in the disclosure may improve the remote maintenance efficiency.

14 Claims, 5 Drawing Sheets

(56) References Cited

U.S. PATENT DOCUMENTS

| | | | | |
|---|---|---|---|---|
| 2011/0292303 A1* | 12/2011 | Nimura | ............... | H04N 9/3194 |
| | | | | 348/745 |
| 2012/0081678 A1* | 4/2012 | Hiranuma | .............. | G03B 17/54 |
| | | | | 353/121 |
| 2013/0201457 A1* | 8/2013 | Watanabe | ............ | G03B 21/147 |
| | | | | 353/69 |
| 2015/0103257 A1 | 4/2015 | Nakashin | | |
| 2015/0237318 A1 | 8/2015 | Nakashin | | |

FOREIGN PATENT DOCUMENTS

| | | | | | |
|---|---|---|---|---|---|
| JP | 2012151670 A | * | 8/2012 | ............ | G09G 3/002 |
| JP | 2015096880 A | * | 5/2015 | | |

\* cited by examiner

FIG. 5

FOCUS IDENTIFICATION METHOD AND FOCUS IDENTIFICATION SYSTEM THEREOF

CROSS-REFERENCE TO RELATED APPLICATION

This application claims the priority benefit of China application serial no. 202210019558.9, filed on Jan. 10, 2022. The entirety of the above-mentioned patent application is hereby incorporated by reference herein and made a part of this specification.

BACKGROUND OF THE DISCLOSURE

Field of the Disclosure

The disclosure relates to a focus identification method, and in particular, to a focus identification method for the sharpness of a projection picture.

Description of Related Art

A conventional projector may be utilized with an imaging capturing device to capture an image of a projection picture, and adjust an imaging position of the focusing lens in the projector according to the sharpness of the captured picture. Generally speaking, the conventional technology may calculate the corresponding relationship between the position of the focusing lens and the sharpness of the entire captured picture, and then find the optimum position for focusing lens corresponding to the optimal sharpness accordingly. However, since the projection picture has different sharpness in multiple regions of the projection picture due to the uniformity of the lens, the optimal sharpness calculated through the conventional technology may not necessarily reflect the optimal quality of projection picture, resulting in the inaccuracy in identification of focus quality. In addition, it is not easy for the remote maintainer to identify the focus quality of the projector through the captured picture obtained by the image capturing device.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE DISCLOSURE

The disclosure provides a focus identification method and a focus identification system thereof, which may display corresponding sharpness values on the projection picture corresponding to various image regions of the captured picture, so that a remote maintainer may easily identify the focus quality.

Other objects and advantages of the disclosure can be further understood from the technical features disclosed in the disclosure. To achieve one or part or all of the above objectives or other objectives, an embodiment of the disclosure provides a focus identification method, which is adaptable for a focus identification system. The focus identification method includes: capturing a projection picture to generate a captured picture; dividing the captured picture into a plurality of image regions; calculating a plurality of sharpness values corresponding to the plurality of image regions respectively according to the image data of the plurality of image regions; displaying the plurality of sharpness values on the projection picture corresponding to the plurality of image regions respectively to generate a first focus identification picture.

Another embodiment of the disclosure provides a focus identification system, and the focus identification system includes a projection device, an image capturing device, a projection target and a processor. The projection device is configured to project the projection picture to the projection target. The image capturing device is coupled to the projection device, and the image capturing device is configured to capture the projection picture on the projection target from the projection target to generate a captured picture. The processor is coupled to the projection device and the image capturing device, and the processor is configured to divide the captured picture into a plurality of image regions, calculate a plurality of sharpness values corresponding to the plurality of image regions respectively according to the image data of the plurality of image regions, and display the plurality of sharpness values on the projection picture corresponding to the plurality of image regions respectively to generate a first focus identification picture.

Based on the above, the embodiments of the disclosure have at least one of the following advantages or effects. The focus identification method in the embodiments of the disclosure may calculate multiple sharpness values of the captured picture region by region, and display the multiple sharpness values on each image region of the projection picture corresponding to the captured picture respectively, so that the remote maintainer may easily identify the focus quality, and recognize the differences before and after maintenance and correction of the projector.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
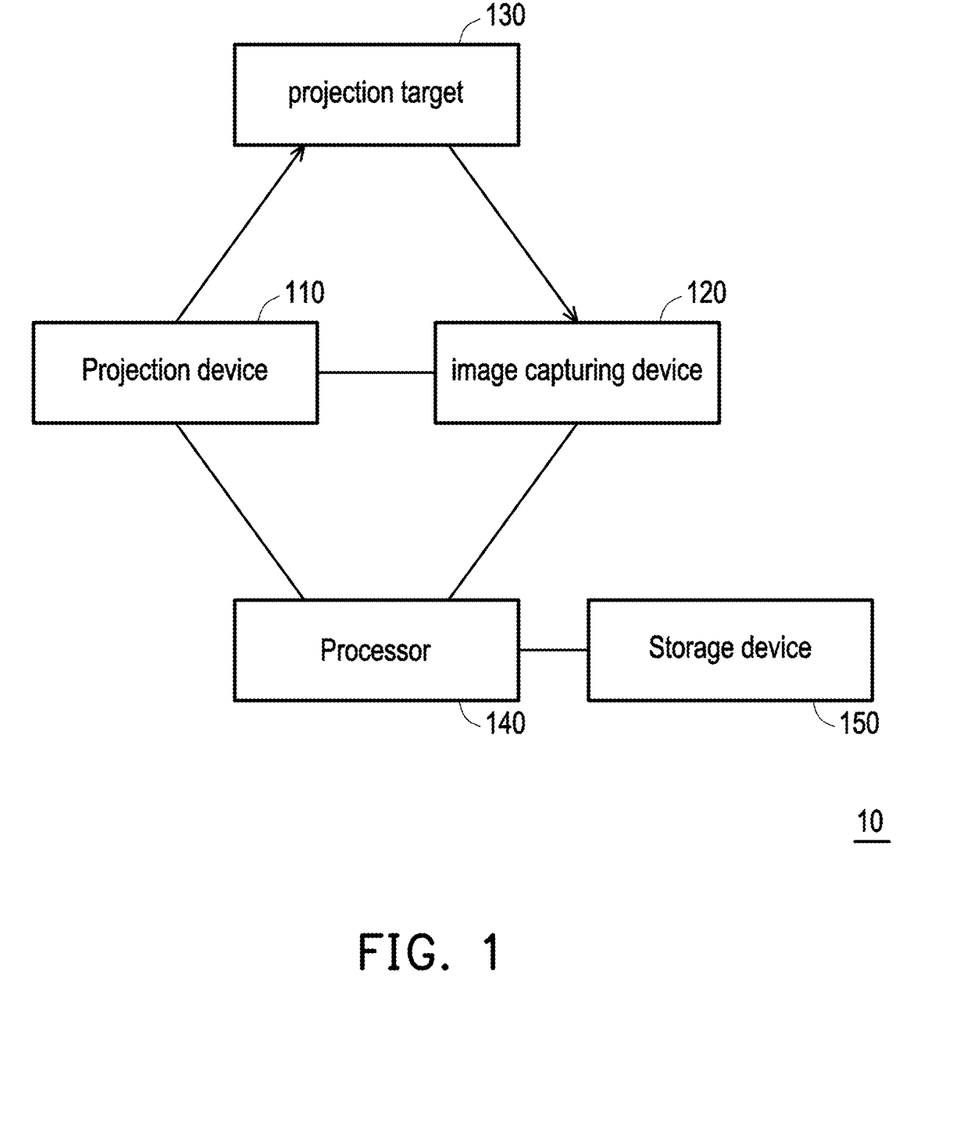
FIG. 1 is a schematic view of a focus identification system according to an embodiment of the present disclosure.

FIG. 1 is a schematic view of a focus identification system according to an embodiment of the disclosure. Referring to FIG. 1, a projection system 10 of the embodiment includes a projection device 110, an image capturing device 120, a projection target 130, a processor 140 and a storage device 150. The projection device 110 is, for example, a projector, and the projector further includes optical elements for projection, such as a light source, a light valve, and a projection lens. The projection device 110 may project a projection picture to the projection target 130 to generate a projection picture. The image capturing device 120 is, for example, a camera, a video camera or other image capturing devices. The image capturing device 120 is coupled to the projection device 110, and the image capturing device 120 may capture the projection picture on the projection target 130 from the projection target 130 to generate a captured picture. The projection target 130 is, for example, a projection screen. The processor 140 is coupled to the projection device 110 and the image capturing device 120. The processor 140 may receive the captured picture from the image capturing device 120, and divide the captured picture into multiple image regions, for example, into nine image regions. The number of image regions may be designed differently according to the actual situation, for example, the image regions may be divided into 16 image regions, 25 image regions, and so on. Here, 9 image regions are used as an example for description. The processor 140 calculates a plurality of sharpness values corresponding to the plurality of image regions respectively according to an image data of the plurality of image regions, and displays the plurality of sharpness values on the projection picture corresponding to the plurality of image regions respectively, so as to generate a focus identification picture. In this embodiment, the focus identification picture is equivalent to displaying multiple sharpness values on the projection picture corresponding to the multiple image regions of the captured picture, which will be described in detail later. The storage device 150 is coupled to the processor 140, and the storage device 150 includes, for example, a read only memory (ROM), a hard disk drive and/or a random access memory (RAM), which is configured to store the focus identification pictures at different times, so that the processor 140 may determine whether the focus identification pictures at different times are consistent.

In an embodiment, the processor 140 may be designed through a hardware description language (HDL) or any other design method for digital circuits known to those skilled in the art, and may be a hardware circuit implemented through a field programmable gate array (FPGA), a complex programmable logic device (CPLD) or an application-specific integrated circuit (ASIC). In this embodiment, the processor 140 may be configured in a remote device or the projection device 110, but is not limited thereto.

Regarding the calculation of the sharpness value, the processor 140 may calculate the sharpness value of the image region by means of convolutional neural network, Sobel edge detection, Laplacian edge detection, and image edge gradient contrast detection to quantify the image quality. The above-mentioned sharpness calculation methods are only examples, and the disclosure is not limited thereto.

Figure 2:
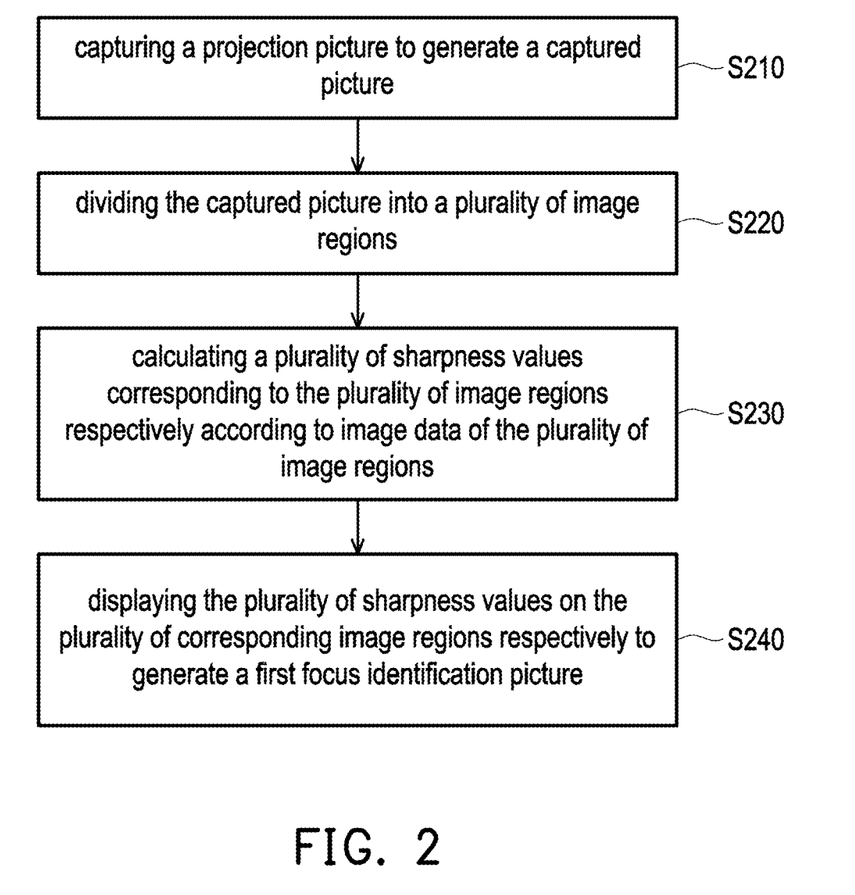
FIG. 2 is a flowchart illustrating a focus identification method according to an embodiment of the present disclosure.
Figure 3:
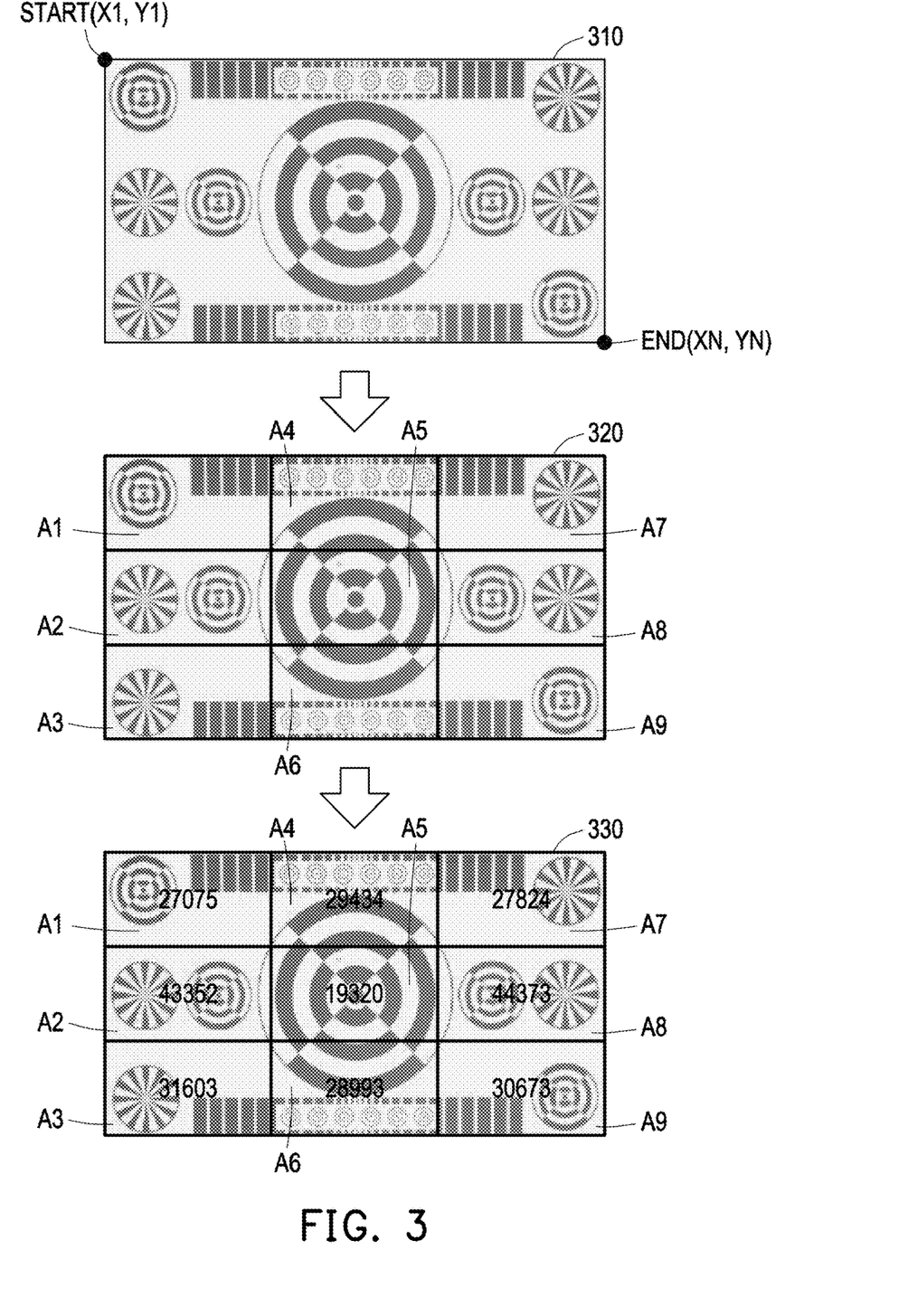
FIG. 3 is a schematic view illustrating a focus identification method according to an embodiment of the present disclosure.

FIG. 2 is a flowchart illustrating a focus identification method according to an embodiment of the disclosure. FIG. 3 is a schematic view illustrating a focus identification method according to an embodiment of the disclosure. Please refer to FIG. 1, FIG. 2 and FIG. 3 simultaneously. In step S210, the image capturing device 120 captures the projection picture projected by the projection device 110 from the projection target 130 to generate a captured picture 310. Next, in step S220, the processor 140 receives the captured picture 310 from the image capturing device 120, and divides the captured picture 310 into an image region A1 to an image region A9, such as a captured picture 320 in FIG. 3. Specifically, the processor 140 may set the identification range of the captured picture 310, and the identification range includes an identification start point coordinate START(X1, Y1) and an identification end point coordinate END(XN, YN). Based on the identification start point coordinate START(X1, Y1) and the identification end point coordinate END(XN, YN), a length from the coordinate X1 to the coordinate XN may be divided into three equal parts, and a width from the coordinate Y1 to the coordinate YN may be divided into three equal parts. In this manner, the captured picture 310 is divided into the image region A1 to the image region A9.

In step S230, the processor 140 calculates a plurality of sharpness values corresponding to the image region A1 to the image region A9 respectively according to the image data of the image region A1 to the image region A9. Next, in step S240, the processor 140 displays a plurality of sharpness values on the projection picture corresponding to the plurality of image region A1 to image region A9 respectively to generate a focus identification picture 330. For example, in the focus identification picture 330, the sharpness value of the image region A1 is 27075, the sharpness value of the image region A2 is 43352, and the sharpness value of the image region A3 is 31603. The sharpness value of the image region A4 is 29434, the sharpness value of the image region A5 is 19320, and the sharpness value of the image region A6 is 28993. The sharpness value of the image region A7 is 27824, the sharpness value of the image region A8 is 44373, and the sharpness value of the image region A9 is 30673.

Figure 4:
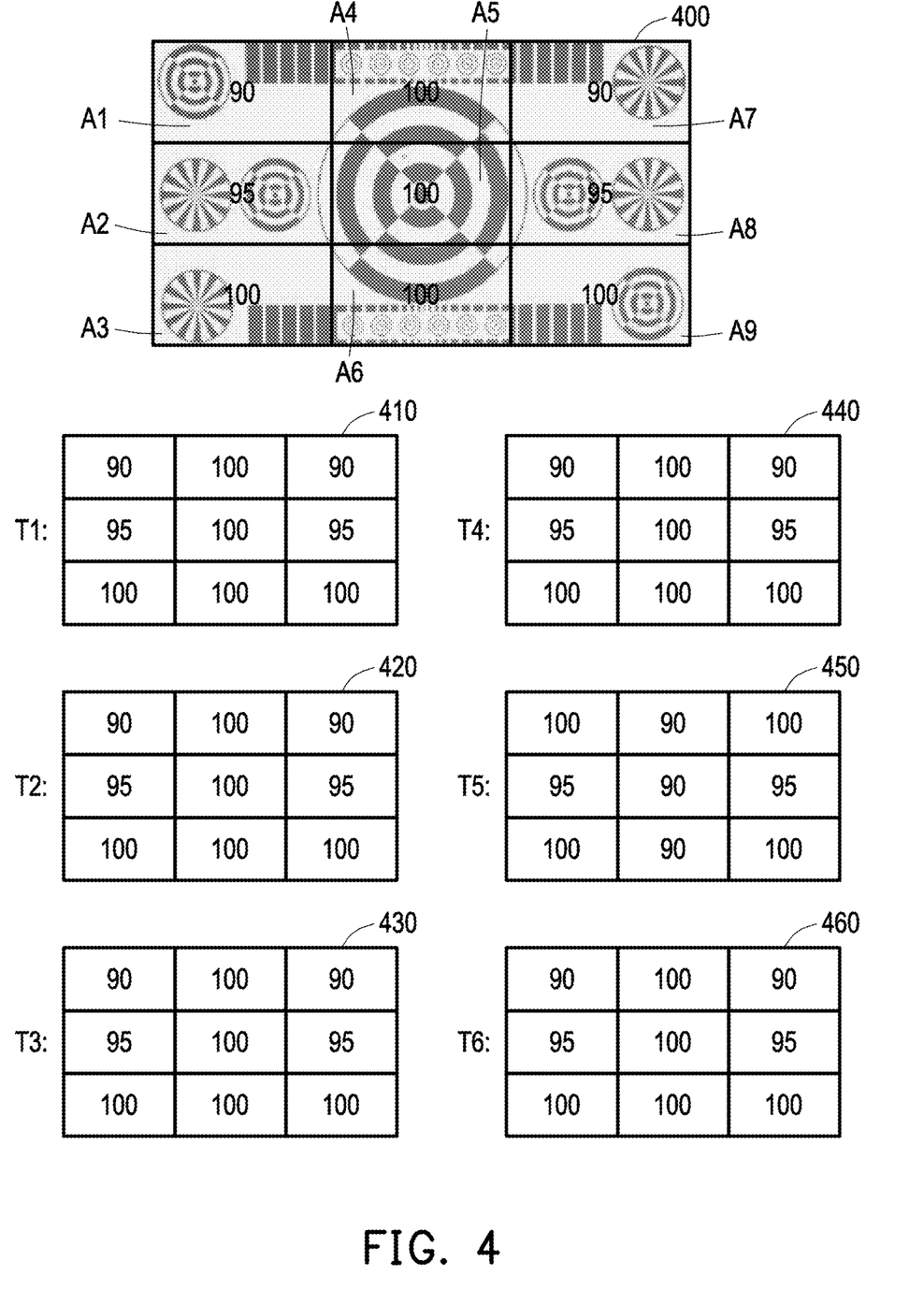
FIG. 4 is a schematic view illustrating maintenance and determining processes of a focus identification method according to an embodiment of the present disclosure.

FIG. 4 is a schematic view illustrating maintenance and determining processes of a focus identification method according to an embodiment of the disclosure. Referring to FIG. 4, at time T1 (first time), the processor 140 generates a focus identification picture 400 (first focus identification picture), and from time T2 to time T6 (second time), the processor 140 sequentially and periodically generates a plurality of corresponding focus identification pictures (a plurality of second focus identification pictures, not shown). At time T1, the sharpness values of the image region A1 to the image region A9 in a focus identification picture 400 are 90, 95, 100, 100, 100, 100, 90, 95, and 100, respectively, which correspond to an image region sharpness value 410 and may serve as a basis for comparison. Next, from time T2 to time T6, the plurality of focus identification pictures (a plurality of second focus identification pictures, not shown) have an image region sharpness value 420 to an image region sharpness value 460 respectively. It should be noted that, in FIG. 4, the distribution of image regions among the image region sharpness value 410 to the image region sharpness value 460 may correspond to the image region A1 to the image region A9 of the focus identification picture 400. To avoid repetition, in FIG. 4, the image region A1 to the image region A9 are not marked in the image region sharpness value 410 to the image region sharpness value 460, please refer to the focus identification picture 400 for details. In this embodiment, the time T1 is, for example, 8:00 am on the first day, the time T2 is, for example, 8:00 am on the second day, the time T3 is, for example, 8:00 am on the third day, the time T4 is, for example, 8:00 am on the fourth day, the time T5 is, for example, 8:00 am on the fifth day, and the time T6 is, for example, 8:00 am on the sixth day. The time interval may be set according to the actual situation, and the disclosure is not limited thereto.

At time T2, the processor 140 compares the image region sharpness value 410 with the image region sharpness value 420 to generate a comparison result. In this embodiment, the processor 140 compares the image region sharpness values according to the change tendency. In the image region sharpness value 410, the sharpness values of the image region A1 to the image region A3 are 90, 95, and 100, respectively, and the change tendency of the sharpness values is ascending. In the image region sharpness value 410, the sharpness values of the image region A4 to the image region A6 are 100, 100, and 100, respectively, and the change tendency of the sharpness values is fixed with no change. In the image region sharpness value 410, the sharpness values of the image region A7 to the image region A9 are 90, 95, and 100, respectively, and the change tendency of the sharpness values is ascending. On the other hand, in the image region sharpness value 420, the sharpness values of the image region A1 to the image region A3 are 90, 95, and 100, respectively, and the change tendency of the sharpness values is also ascending. In the image region sharpness value 420, the sharpness values of the image region A4 to the image region A6 are 100, 100, and 100, respectively, and the change tendency of the sharpness values is fixed with no change. In the image region sharpness value 420, the sharpness values of the image region A7 to the image region A9 are 90, 95, and 100, respectively, and the change tendency of the sharpness values is ascending. In other words, the sharpness values in the image region sharpness value 410 and the image region sharpness value 420 have the same change tendency. The processor 140 may determine, according to the comparison result, not to perform auto focus at time T2 to correct the sharpness variation, and also there is no need to provide a maintenance prompt.

At time T3, time T4, and time T6, since the sharpness values in the image region sharpness value 410 are the same as the sharpness values in the image region sharpness value 430, the image region sharpness value 440, and the image region sharpness value 460, please refer to time T2 for the comparison result of the sharpness values and the determining process of the change tendency, related description is not repeated here.

At time T5, the processor 140 compares the image region sharpness value 410 with the image region sharpness value 450 to generate a comparison result. In this embodiment, in the image region sharpness value 450, the sharpness values of the image region A1 to the image region A3 are 100, 95, and 100, respectively, and the change tendency of the sharpness values is descending followed by ascending. In the image region sharpness value 450, the sharpness values of the image region A4 to the image region A6 are 90, 90, and 90, respectively, and the change tendency of the sharpness values is fixed with no change. In the image region sharpness value 450, the sharpness values of the image region A7 to the image region A9 are 100, 95, and 100, respectively, and the change tendency of the sharpness values is descending followed by ascending. In other words, the change tendency of the sharpness values in the image region sharpness value 410 is not completely the same as the change tendency of the sharpness values in the image region sharpness value 450. It may be acquired that the focus identification picture (the second focus identification picture, not shown) at time T5 has changed as compared to the focus identification picture 400 (the first focus identification picture) at time T1, and the processor 140 may determine to perform auto focus at time T5 according to the comparison result to correct the sharpness variation. In addition, the processor 140 may provide maintenance prompts to the user or the remote maintainer through various display methods, such as displaying graphics or text messages on the display screen of the projection device 110 or the display screen of the remote device, so as to remind the user or the remote maintainer of the need to carry out maintenance for sharpness variation.

In another embodiment, the processor 140 may determine whether to perform auto focus and provide a maintenance prompt according to whether the sharpness values of the two compared focus identification pictures are completely identical. For example, since the sharpness values in the image region sharpness value 410 and the image region sharpness value 420 are exactly the same, the processor 140 may determine, according to the comparison result, not to perform auto focus at time T2 to correct the sharpness variation and not to provide maintenance prompts. Since the sharpness values of multiple image regions in the image region sharpness value 410 and the image region sharpness value 450 are not exactly identical, the processor 140 may determine, according to the comparison result, to perform auto focus and provide maintenance prompts at time T5.

Figure 5:
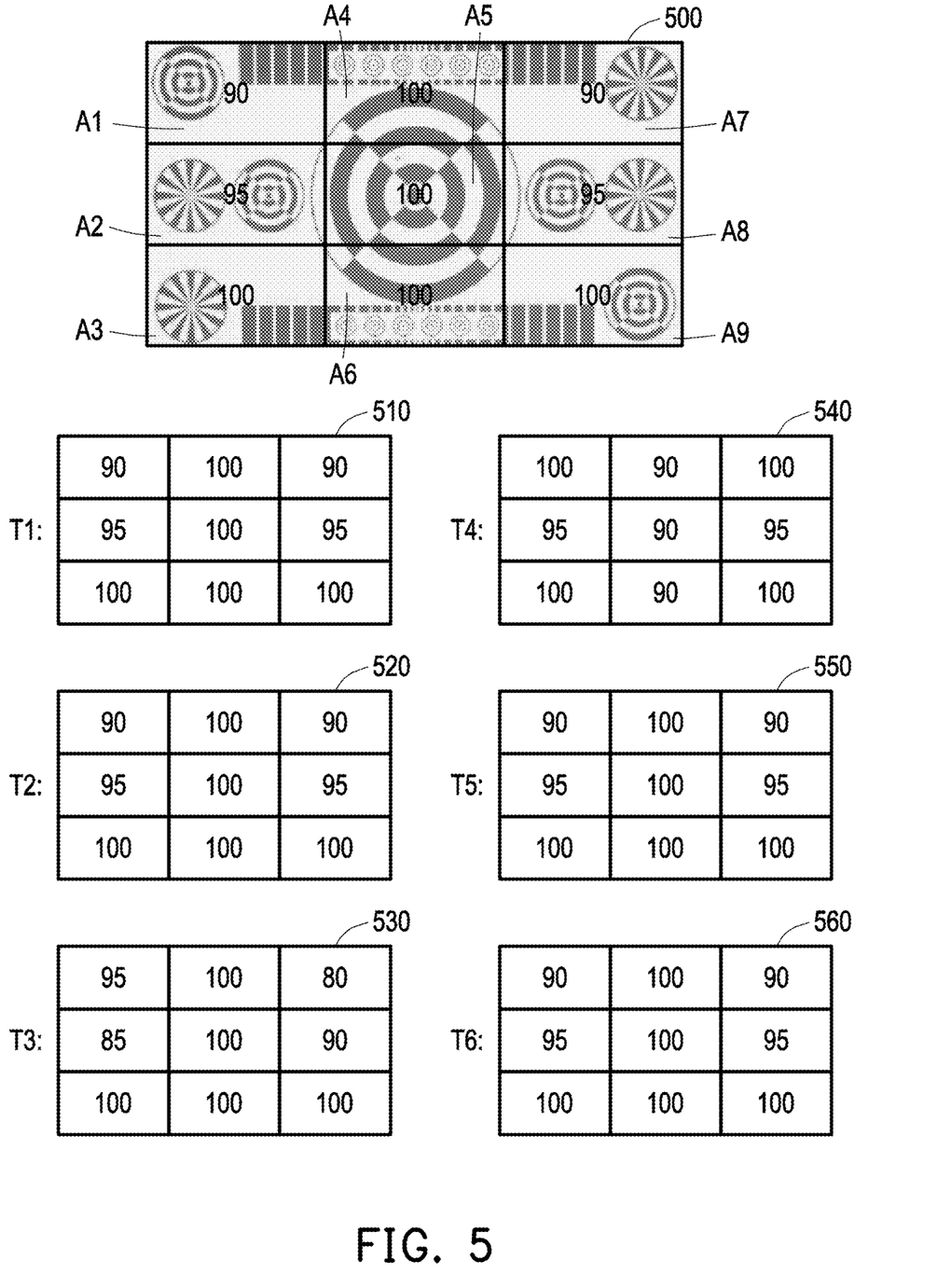
FIG. 5 is a schematic view illustrating maintenance and determining processes of a focus identification method according to another embodiment of the present disclosure.

FIG. 5 is a schematic view illustrating maintenance and determining processes of a focus identification method according to another embodiment of the disclosure. Referring to FIG. 5, at time T1 (first time), the processor 140 generates a focus identification picture 500 (first focus identification picture), and from time T2 to time T6 (second time), the processor 140 sequentially and periodically generates a plurality of focus identification pictures (a plurality of second focus identification pictures, not shown). At time T1, the sharpness values of the image region A1 to the image region A9 in a focus identification picture 500 are 90, 95, 100, 100, 100, 100, 90, 95, and 100, respectively, which correspond to the image region sharpness value 510 and may serve as a basis for comparison. Next, from time T2 to time T6, the plurality of focus identification pictures (a plurality of second focus identification pictures, not shown) have an image region sharpness value 520 to an image region sharpness value 560 respectively. It should be noted that, in FIG. 5, the distribution of image regions in the image region sharpness value 510 to the image region sharpness value 560 may correspond to the image region A1 to the image region A9 of the focus identification picture 500. To avoid repetition, in FIG. 5, the image region A1 to the image region A9 are not marked in the image region sharpness value 510 to the image region sharpness value 560, please refer to the focus identification picture 500 for details.

At time T2, the processor 140 compares the image region sharpness value 510 with the image region sharpness value 520 to generate a comparison result. In this embodiment, the processor 140 compares the image region sharpness values according to the distribution position. The largest sharpness value among the image region sharpness value 510 is 100, which is distributed in the image region A3, the image region A4, the image region A5, the image region A6, and the image region A9. The largest sharpness value among the image region sharpness value 520 is 100, which is also distributed in the image region A3, the image region A4, the image region A5, the image region A6, and the image region A9. In other words, the distribution positions of the largest sharpness values in the image region sharpness value 510 and the image region sharpness value 520 are exactly the same. The processor 140 may determine that the auto focus is not performed at the time T2 to correct the sharpness variation, and the maintenance prompt is not required as well.

At time T3, time T5, and time T6, since the distribution position of the largest sharpness value in the image region sharpness value 510 is completely the same as the distribution positions of the largest sharpness values in the image region sharpness value 530, the image region sharpness value 550, and the image region sharpness value 560, please refer to the time T2 for the comparison result of the sharpness values and the determining process, related description is not repeated here. It should be mentioned that although at time T3 and in the image region sharpness value 530, the sharpness value of the image region A1 is 95, the sharpness value of the image region A2 is 85, the sharpness value of the image region A7 is 80, and the sharpness value of the image region A8 is 90, which are all different from the sharpness values in the corresponding image regions in the image region sharpness value 510, the largest sharpness value in the image region sharpness value 530 is distributed in the image region A3, the image region A4, the image region A5, the image region A6, and the image region A9, and the distribution position of the largest sharpness value is exactly the same as the image region sharpness value 510. Therefore, under this comparison logic, although the sharpness values of the image regions in the two image region sharpness values are not exactly identical, the processor 140 may still determine that the auto focus is not performed at the time T3 to correct the sharpness variation, and maintenance prompt is not required as well.

At time T4, the processor 140 compares the image region sharpness value 510 with the image region sharpness value 540 to generate a comparison result. In this embodiment, the largest sharpness value of the image region sharpness value 540 is 100, which is distributed in the image region A1, the image region A3, the image region A7, and the image region A9. In other words, the distribution positions of the largest sharpness values in the image region sharpness value 510 and the image region sharpness value 540 are not exactly the same, and it may be acquired that the focus identification picture (the second focus identification picture, not shown) at time T4 has changed as compared to the focus identification picture 500 (the first focus identification picture) at time T1, the processor 140 may determine to perform auto focus at time T4 according to the comparison result to correct the sharpness variation. Moreover, the processor 140 may provide maintenance prompts to the user or the remote maintainer through various display methods, such as displaying graphics or text messages on the display screen of the projection device 110 or the display screen of the remote device, so as to remind the user or the remote maintainer of the need to carry out maintenance for sharpness variation.

In summary, the embodiments of the disclosure have at least one of the following advantages or effects. The focus identification method in the embodiments of the disclosure may calculate multiple sharpness values of the captured picture region by region, and display the multiple sharpness values on the projection picture corresponding to each image region of the captured picture respectively, so that the remote maintainer may easily identify the focus quality, and recognize the differences before and after maintenance and correction performed to the projection device. Moreover, a focus identification picture may also be generated periodically. By comparing the sharpness values of each image region in the focus identification picture at different times, it may be determined whether auto focus is required and whether a maintenance prompt should be provided to the remote maintainer, thereby improving the remote maintenance efficiency.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A focus identification method, adaptable for a focus identification system, the focus identification method comprising:
    capturing a projection picture projected by a projection device from a projection target to generate a captured picture, wherein the projection picture comprises an identification pattern;
    dividing the captured picture into a plurality of image regions corresponding to the projection picture;
    calculating a plurality of sharpness values corresponding to the plurality of image regions respectively by a processor according to image data of the plurality of image regions; and generating a first focus identification picture by the processor, wherein the first focus identification picture has the plurality of sharpness values on the projection picture corresponding to the plurality of image regions of the captured picture respectively, wherein the plurality of sharpness values of the first focus identification picture correspond to the identification pattern of the projection picture.

2. The focus identification method according to claim 1, further comprising:
after generating the first focus identification picture at a first time, generating a second focus identification picture at a second time;
comparing the plurality of sharpness values of the first focus identification picture with the plurality of sharpness values of the second focus identification picture to generate a comparison result; and
determining whether to perform auto focus and provide maintenance prompts according to the comparison result.

3. The focus identification method according to claim 1, further comprising:
after generating the first focus identification picture, generating a plurality of second focus identification pictures sequentially and periodically at other times.

4. The focus identification method according to claim 2, further comprising:
when a change tendency of the plurality of sharpness values of the first focus identification picture is the same as a change tendency of the plurality of sharpness values of the second focus identification picture, the auto focus is not performed and the maintenance prompts are not provided,
when the change tendency of the plurality of sharpness values of the first focus identification picture is different from the change tendency of the plurality of sharpness values of the second focus identification picture, the auto focus is performed and the maintenance prompts are provided.

5. The focus identification method according to claim 2, wherein
when the plurality of sharpness values of the first focus identification picture are completely the same as the plurality of sharpness values of the second focus identification picture, the auto focus is not performed and the maintenance prompts are not provided,
when the plurality of sharpness values of the first focus identification picture are not completely the same as the plurality of sharpness values of the second focus identification picture, the auto focus is performed and the maintenance prompts are provided.

6. The focus identification method according to claim 2, wherein
when a distribution position of at least one largest sharpness value of the first focus identification picture is completely the same as a distribution position of the at least one largest sharpness value of the second focus identification picture, the auto focus is not performed and the maintenance prompts are not provided,
when the distribution position of the at least one largest sharpness value of the first focus identification picture is not completely the same as the distribution position of the at least one largest sharpness value of the second focus identification picture, the auto focus is performed and the maintenance prompts are provided.

7. The focus identification method according to claim 1, wherein the step of dividing the captured picture into the plurality of image regions comprises:
setting an identification range of the captured picture, wherein the identification range comprises an identification start point coordinate and an identification end point coordinate; and
dividing the captured picture into the plurality of image regions according to the identification start point coordinate and the identification end point coordinate.

8. A focus identification system, comprising:
a projection device, configured to project a projection picture to a projection target;
an image capturing device, coupled to the projection device, configured to capture the projection picture on the projection target from the projection target to generate a captured picture, wherein the projection picture comprises an identification pattern;
a processor, coupled to the projection device and the image capturing device, configured to divide the captured picture into a plurality of image regions corresponding to the projection picture, and calculate a plurality of sharpness values corresponding to the plurality of image regions respectively according to image data of the plurality of image regions, and generate a first focus identification picture, wherein the first focus identification picture has the plurality of sharpness values on the projection picture corresponding to the plurality of image regions of the captured picture respectively, wherein the plurality of sharpness values of the first focus identification picture correspond to the identification pattern of the projection picture.

9. The focus identification system according to claim 8, wherein after the processor generates the first focus identification picture at a first time, generates a second focus identification picture at a second time, compares the plurality of sharpness values of the first focus identification picture with the plurality of sharpness values of the second focus identification picture to generate a comparison result, and determines whether to perform auto focus and provide maintenance prompts according to the comparison result.

10. The focus identification system according to claim 8, wherein after the processor generates the first focus identification picture, generates a plurality of second focus identification pictures sequentially and periodically at other times.

11. The focus identification system according to claim 9, wherein
when the processor determines that a change tendency of the plurality of sharpness values of the first focus identification picture is the same as a change tendency of the plurality of sharpness values of the second focus identification picture, the projection device does not perform the auto focus and not provide the maintenance prompts,
when the processor determines that the change tendency of the plurality of sharpness values of the first focus identification picture is different from the change tendency of the plurality of sharpness values of the second focus identification picture, the projection device performs the auto focus and provides the maintenance prompts.

12. The focus identification system according to claim 10, wherein
when the processor determines that the plurality of sharpness values of the first focus identification picture are completely the same as the plurality of sharpness values of the second focus identification picture, the projection device does not perform the auto focus and not provide the maintenance prompts, when the processor determines that the plurality of sharpness values of the first focus identification picture are not completely the same as the plurality of sharpness values of the second focus identification picture, the projection device performs the auto focus and provides the maintenance prompts.

13. The focus identification system according to claim 10, wherein when the processor determines that a distribution position of at least one largest sharpness value of the first focus identification picture is completely the same as a distribution position of the at least one largest sharpness value of the second focus identification picture, the projection device does not perform the auto focus and not provide the maintenance prompts, when the processor determines that the distribution position of the at least one largest sharpness value of the first focus identification picture is not completely the same as the distribution position of the at least one largest sharpness value of the second focus identification picture, the projection device performs the auto focus and provides the maintenance prompts.

14. The focus identification system according to claim 8, wherein the processor sets an identification range of the captured picture, and the identification range comprises an identification start point coordinate and an identification end point coordinate, and divides the captured picture into the plurality of image regions according to the identification start point coordinate and the identification end point coordinate.

* * * * *